United States Patent [19]

Bock

[11] 4,239,953
[45] Dec. 16, 1980

[54] RESISTANCE WELDING APPARATUS

[75] Inventor: John C. Bock, Madison, Wis.

[73] Assignee: Bock Corporation, Madison, Wis.

[21] Appl. No.: 961,365

[22] Filed: Nov. 16, 1978

[51] Int. Cl.³ .................... B23K 11/00; B23K 11/32
[52] U.S. Cl. ...................................... 219/79; 219/66; 219/107
[58] Field of Search .................... 219/79, 107, 66

[56] References Cited

U.S. PATENT DOCUMENTS

| 2,550,965 | 5/1951 | Brown | 219/107 X |
| 3,600,548 | 8/1971 | Bock | 219/79 |

Primary Examiner—E. A. Goldberg
Attorney, Agent, or Firm—Isaksen, Lathrop, Esch, Hart & Clark

[57] ABSTRACT

Welding apparatus particularly adapted for use in welding parts into the interior surfaces of a metal tube in a pre-determined pattern obtained by longitudinal and rotational indexing of the tube. An elongated electrode arm, which is selectively flexible in one direction, extends into the tube and has a feed track attached thereto through which the metal pieces to be welded are moved into position to the welding head on the end of the electrode arm. The other end of the electrode arm is rigidly connected to a mount and is electrically insulated therefrom. A hydraulic piston carried by the electrode arm at its free end is actuatable to drive the entire arm sideways in its direction of flexibility so as to bring the piece to be welded into firm contact with the inside of the tube. Electrical current is then passed through the electrode arm and the piece to be welded, to the tube, and then to a grounded contact, to resistance weld the metal piece to the tube.

5 Claims, 7 Drawing Figures

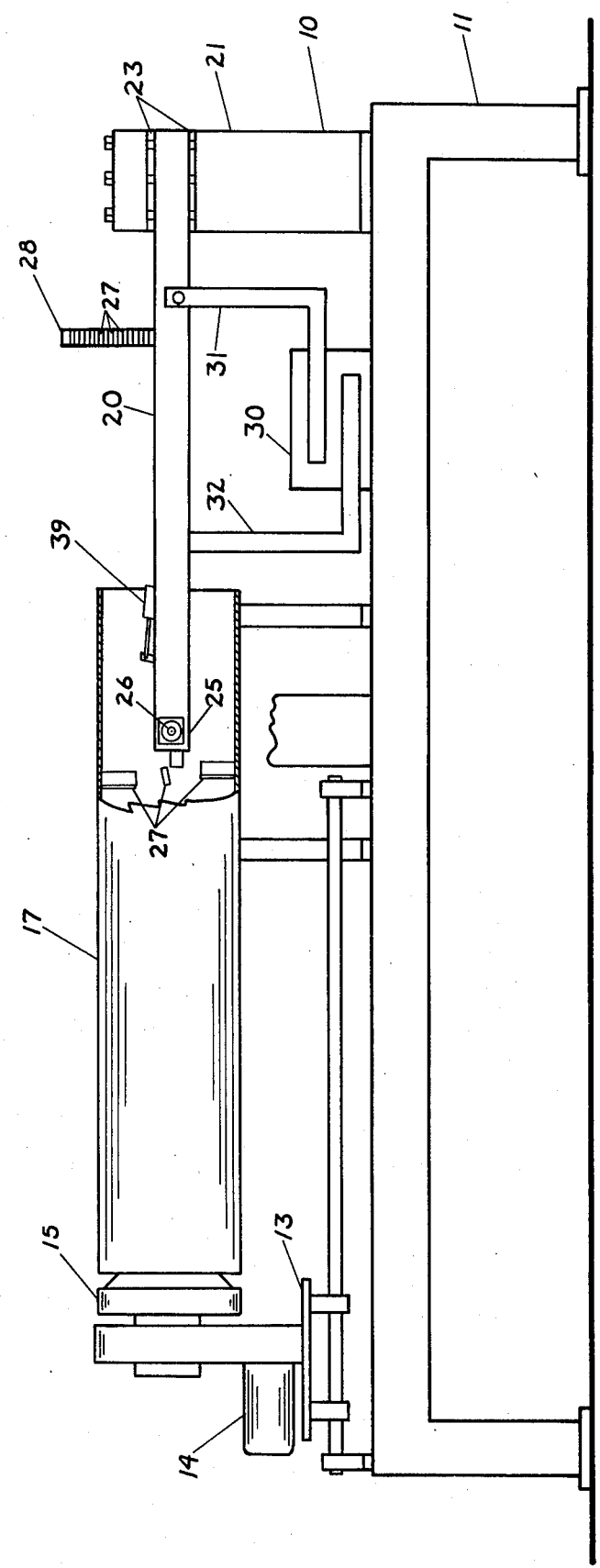

ically conductivity and has the welding head mounted on its free end. A baffle feed track is mounted to the electrode arm and delivers baffles in position to have a single baffle at the end of the arm brought into engagement with the inside of the tube.

RESISTANCE WELDING APPARATUS

BACKGROUND OF THE INVENTION

1. Field of the Invention

This invention pertains generally to resistance welding machines and particularly to those adapted to weld metal parts within a metal tube.

2. Description of the Prior Art

Tubes having welded metal baffles on the interior surface of the tubes are commonly used as heat exchange members in boilers, water heaters and in other heat exchange devices. Prior apparatus for welding such baffles within a tube is shown in the U.S. patent to Bock, U.S. Pat. No. 3,600,548. In the machine disclosed therein, the welding head is mounted on a rigid arm that can be extended into the tube. Flat steel baffles are fed down the length of the arm to a mechanism which engages a single baffle and places it in a transversely movable cross head. The cross head is driven by a piston under pressure to force one of the baffles against the tube inside wall, at which time a surge of current causes the baffle to be welded to the wall. The physical size of this mechanism and the space required to allow the transverse movement of the cross head limits the use of the mechanism to larger diameter tubes. The transversely moveable cross head has also been subject to erratic movement and, as might be expected, it is also subject to rapid wear because of the sliding action required.

SUMMARY OF THE INVENTION

The welding apparatus of the invention includes an elongated electrode arm that is rigidly cantilever mounted to and insulated from a mounting member at one of its ends. The electrode arm is selectively flexible in one direction, such as by being built with a rectangular cross section having a substantially greater height than width. The arm is made of a material having high electrical conductivity and has the welding head mounted on its free end. A baffle feed track is mounted to the electrode arm and delivers baffles in position to have a single baffle at the end of the arm brought into engagement with the inside of the tube.

A high pressure hydraulic cylinder is mounted on the end of the electrode arm and has an electrically insulated plunger which extends toward the side wall of the tube in the direction of flexibility of the electrode arm. Activation of this power cylinder drives the plunger into contact with the side wall of the tube and flexes the entire arm toward the other wall of the tube to place the metal baffle into firm contact with the inside wall of the tube. A surge of electrical current then passes through the electrode arm and the baffle to the wall of the tube and thence to an external ground contact to complete the weld.

Utilization of the flexible electrode arm eliminates the wear previously encountered in the welding head, and greatly simplifies the electrical path to the baffle since a continous path may be formed completely through the welding arm to the baffle without the need for flexible electrical connections. Because no sliding movement is required within the welding head, the entire arm may be inserted into smaller diameter tubes than was possible with prior known resistance welding apparatus.

Further objects, features and advantages of the invention will be apparent from the following detailed description taken in conjunction with the accompanying drawings showing preferred embodiment of resistance welding apparatus exemplifying the invention.

BRIEF DESCRIPTION OF THE DRAWINGS

In the drawings:

FIG. 2 is a front elevational view of the apparatus of FIG. 1 with portions of the tube and the apparatus being broken away for purposes of illustration.

DESCRIPTION OF THE PREFERRED EMBODIMENT

Figure 1:
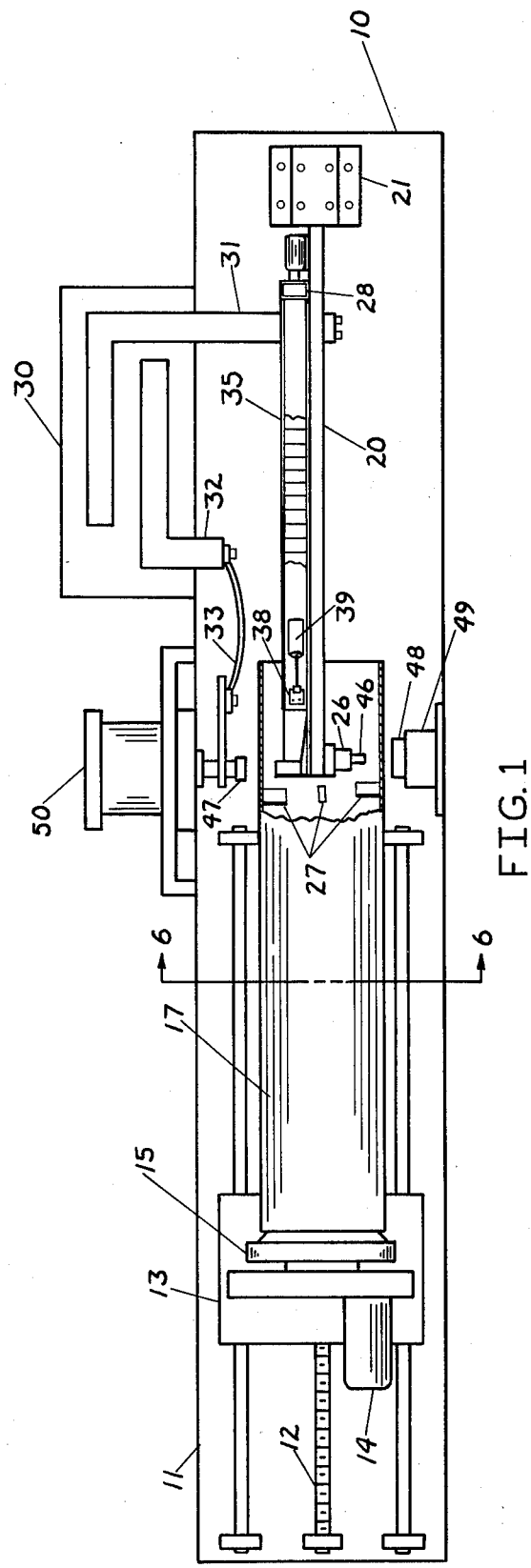
FIG. 1 is a top plan view showing a resistance welding apparatus in accordance with the invention, with portions of the tube being welded broken away for purposes of illustration.

With reference to the drawings, wherein like numerals refer to like parts in each view, the resistance welding apparatus of the invention is shown generally at 10 in FIG. 1. The apparatus is particularly adapted for welding baffle pieces in a spiral pattern in a heat exchange tube, although it would be apparent to those skilled in the art that such apparatus can be utilized for other purposes requiring similar resistance welding within a confined area. The apparatus has a machine frame 11, an indexing screw 12 rotatably mounted at each end to the machine frame 11, and a carriage assembly 13 mounted to the indexing screw to be linearly moved by rotation of the screw. The carriage assembly includes an electric motor 14 connected to rotate a tube gripper 15 which is engaged at one end to the metal tube 17 in which the metal baffles are to be welded. The gripper 15 is adapted to hold the tube 17 in substantially cantilevered position as shown in FIGS. 1 and 2, and is insulated to electrically isolate the tube 17 from the carriage 13.

An elongated electrode arm 20 is rigidly mounted at one end to a mounting member 21 which is itself attached to the machine frame 11. As best shown in FIG. 2, insulated supports 23 rigidly attach the electrode arm 20 to the mounting member 21 while electrically insulating the arm from the mounting member and the rest of the apparatus. The electrode arm 20 extends in cantilever fashion into the hollow interior of the tube 17. As indicated below, the arm 20 is selectively flexible in one direction normal to its length. Preferably, the arm 20 is adapted to flex horizontally but is resistant to flexing vertically.

The free end 25 of the electrode arm 20 has a horizontally disposed drive cylinder 26 mounted thereon. A stack of baffles 27 is delivered by a baffle chute 28 to a baffle track (not shown in FIG. 2) mounted to the electrode arm 20.

The electric welding current is delivered by a welding generator 30 through a power supply bus conductor 31 to the electrode arm 20 at a point of attachment near the end at which it is mounted. A ground conductor 32 is connected by a flexible strap 33 to the ground contact 47 to provide a return path for current to the welding generator 30.

Figure 5:
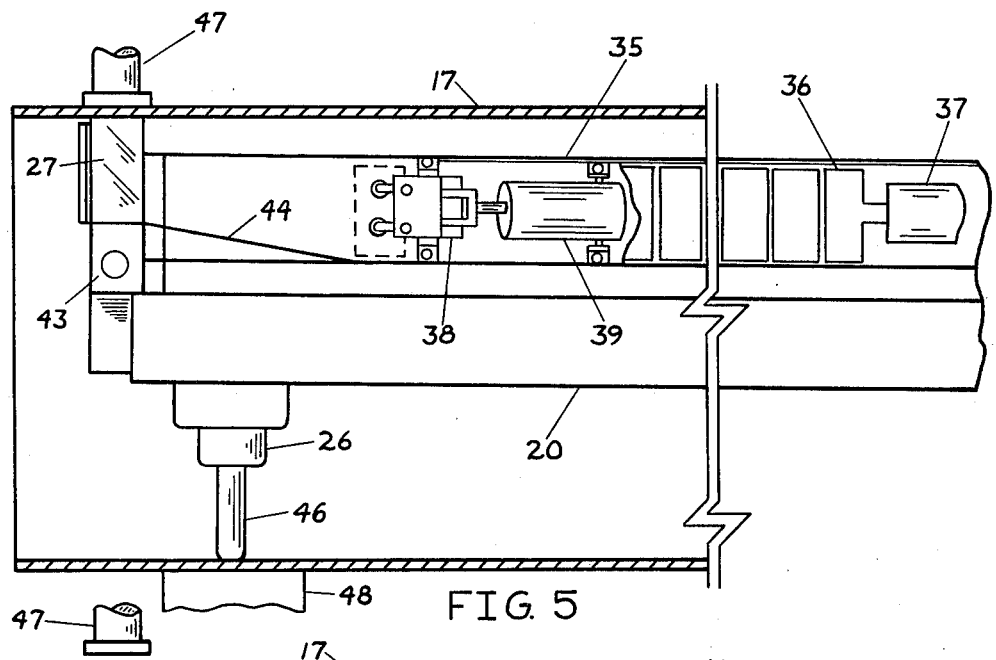
FIG. 5 is a top cross-sectional view through the tube showing the electrode arm in position to make welding contact between a baffle and the inside of the tube.
Figure 4:
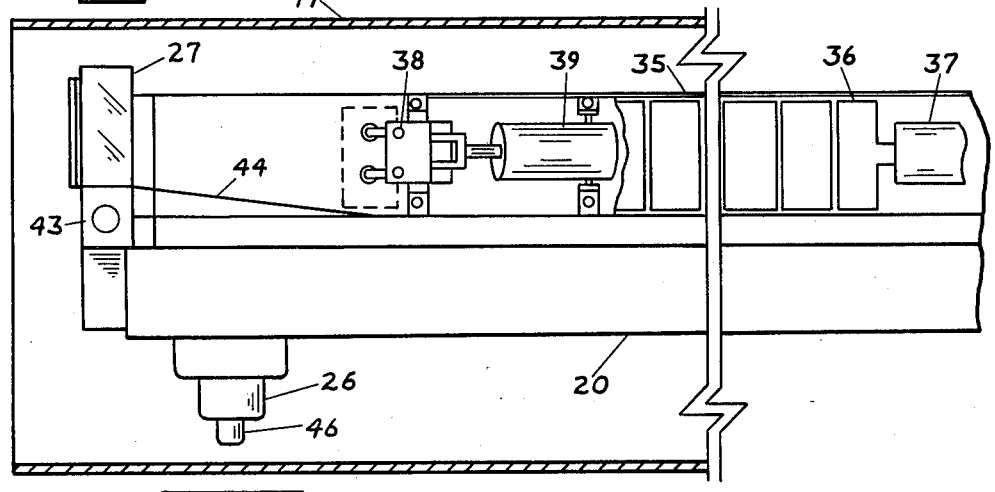
FIG. 4 is a top cross-sectional view through the tube with the electrode arm shown in its normal retracted position away from the inside walls of the tube.
Figure 3:
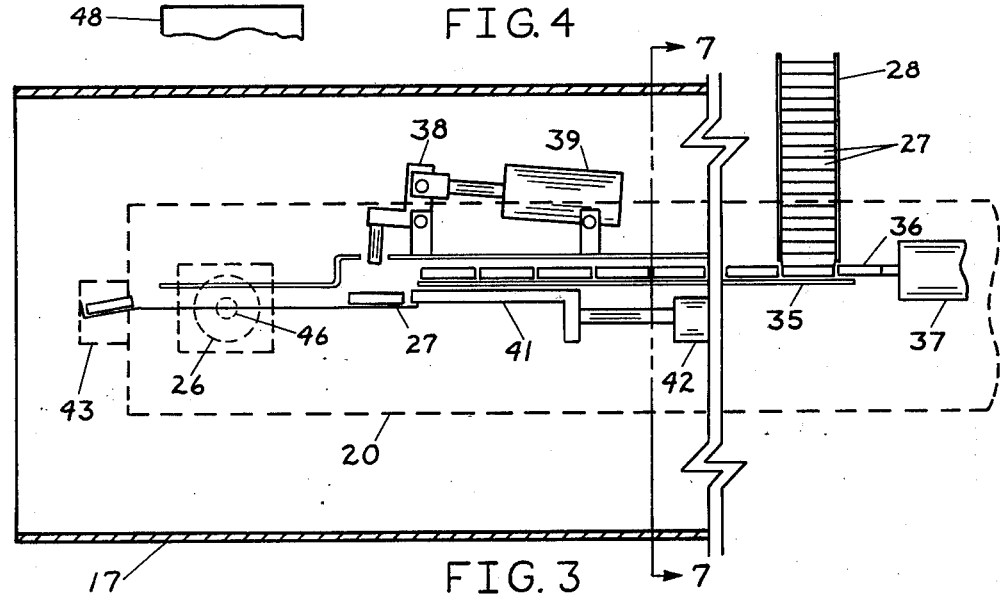
FIG. 3 is a side cross-sectional view through the tube with the electrode arm shown in dashed lines.

The operation of the welding apparatus within the tube is best shown with reference to the views of FIGS. 3-5, each of which is a view of the free end of the electrode arm and with the tube partially cut away. The view of FIG. 3 in particular is an elevational view of the free end of the electrode arm as seen in FIG. 2, with the electrode arm being shown in dashed lines to allow a view of parts of the apparatus on the side of the arm which would otherwise be hidden. As shown therein, baffle pieces from the chute 28 are received on a baffle feed track 35 which is attached to the side of the electrode arm 20. The baffle pieces are pushed along the track 35 by a baffle pusher 36 which is driven by a spring retracted air cylinder 37. At the end of the feed track 35, the individual baffles are indexed to the side one at a time by a pivoted slicer 38 which is driven by a spring retracted air cylinder 39. The individually indexed baffle pieces 27 are then driven forwardly by a pusher lug 41 which is driven by a reciprocally acting air cylinder 42. The pusher lug pushes each piece to a baffle end support 43 which is firmly mounted and electrically connected to the electrode arm 20.

The view of FIG. 4 is a top view of the free end electrode arm. As seen in FIG. 4, the pusher lug 41 advances the baffle pieces up a ramp 44 to a position on the baffle end support 43 wherein the baffle piece to be welded extends outwardly beyond the baffle feed track. The hydraulic drive cylinder 26 has its plunger 46 retracted in its position. The plunger 46 is preferably made of a strong material that has high electrical resistance. One material that has been found suitable for this purpose is molded Delrin available from Du Pont. In the unactivated position shown in FIG. 4, a back up electrical contact 47, which is electrically connected to the ground conductor 32, is in its retracted position out of contact with the outer walls of the tube. A counteracting electrically insulating abutment member 48 is also retracted from engagement with the outside surface of the tube.

Activation of the hydraulic drive cylinder 26 presses the plunger 46 into contact with the inner wall of the tube, as best shown in FIG. 4. The tube is backed up by the counter-acting abutment member 48, which is driven into firm contact with the outside of the tube by a power cylinder 49. The strong force applied by the hydraulic cylinder 26, which preferably has the capacity to apply up to 1,000 p.s.i. to the plunger 46, forces the electrode arm 20 to flex toward the opposite wall of the tube and to thus bring the extending baffle piece 27 into firm contact with the inside surface. At the same time, the back up contact 47 is driven into contact with the outside surface of the tube by a power cylinder 50, and a current surge is passed from the welding generator through the electrode arm 20, baffle end support 43, baffle 27, tube 17 and back up contact 47, to complete the circuit to the generator 30.

Figure 6:
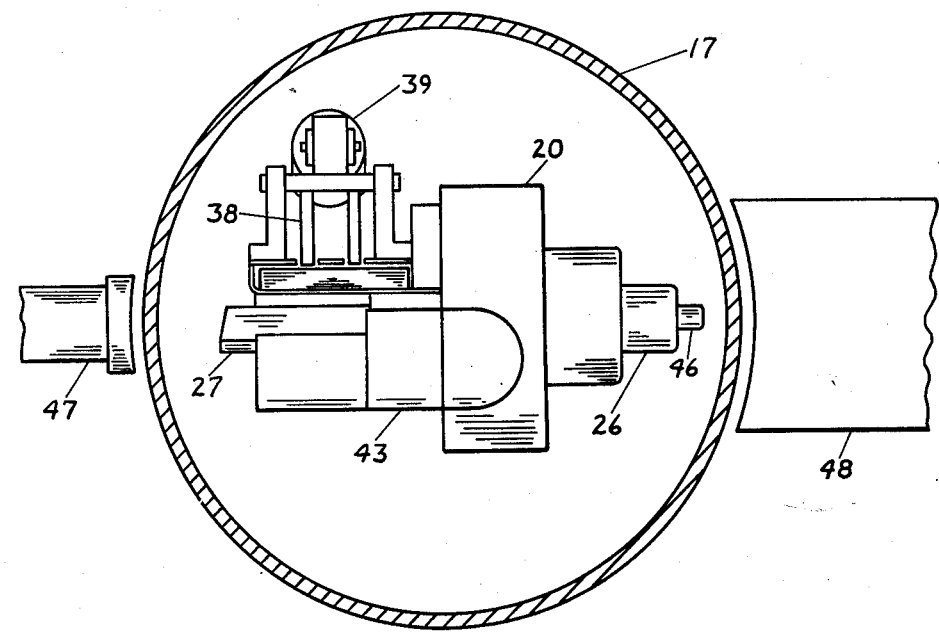
FIG. 6 is a cross-sectional view taken along the lines 6—6 of FIG. 1 showing the free end of the electrode arm.
Figure 7:
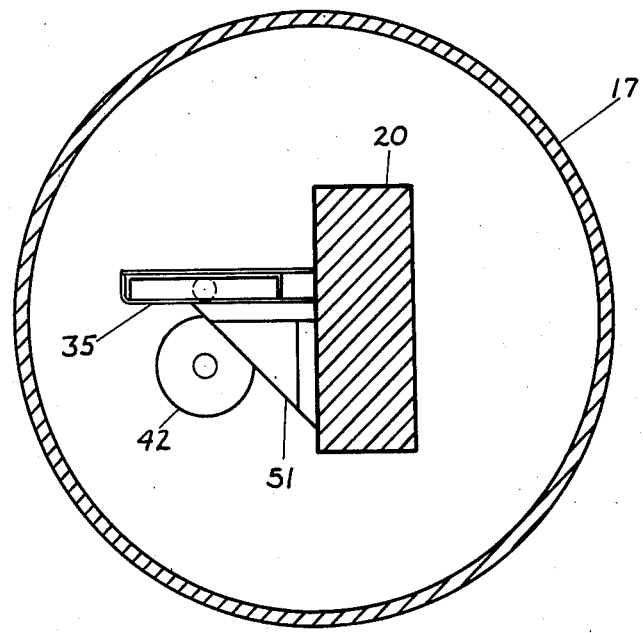
FIG. 7 is a cross-sectional view through the tube and electrode arm taken along the line 7—7 of FIG. 3.

The structure of the electrode arm is best shown with reference to the cross-sectional views of FIGS. 6 and 7. FIG. 6 shows the end of the electrode arm 20 in a neutral position out of contact with the side walls of the tube. As shown, the electrode arm preferably has a rectangular cross-section, with the vertical height of the arm preferably being substantially greater than the width of the arm, a ratio of 2.5 to 1 being shown for exemplification. The narrower width extends in the direction in which the arm is to flex toward the back up electrode, thus making the arm 20 selectively flexible in this direction.

As best shown in FIG. 7, the feed track 35 is attached to the side of the arm 20 and supported outwardly of the arm by braces 51. Current is conducted directly through the electrode arm 20, and therefore it is highly desirable that this arm be as electrically conductive as possible. Copper is a suitable metal for construction of the arm and certain alloys of copper may also be utilized to make the arm flexible yet resistant to metal fatigue. The arm as shown is substantially greater in height along the vertical direction then it is in width in the horizontal direction, and therefore it will have strong resistance to sagging vertically at the free end under the weight of the various parts that are mounted on the arm. It is apparent that the actual movement of the baffle pieces 27 into contact with the end of the tube is accomplished with a minimum amount of motion, involving only the extension and retraction of the plunger 46. This allows the entire apparatus to be made very compact and minimizes the wear and erratic movements commonly associated with sliding welding heads. Because the arm is rigidly mounted at one end, the action of the drive cylinder 26 will cause the arm to bend or "bow" along its length. This bowing action ensures that most of the length of the arm will remain well away from the inside of the tube so that unwanted electrical arcing does not occur. The rigid arm also has much greater stability than can be practically obtained with an arm hingedly mounted at its fixed end. The overall compactness and small movements required by the apparatus of the invention allow welding within tubes as small as four inches in diameter.

As indicated above, the spiral pattern of baffle pieces 27 within the interior of the tube is accomplished by the selective rotation and longitudinal indexing of the tube, while the free end of the electrode arm within the tube remains stationary.

It is understood that the invention in not confined to the particular construction and arrangement of parts herein illustrated and described, but embraces all such modified forms thereof as come within the scope of the following claims.

I claim:

1. Resistance welding apparatus for welding metal pieces to the inside surface of a metal tube, comprising:
   (a) means for holding the tube in which the pieces are to be welded;
   (b) an elongated electrically conductive electrode arm rigidly cantilever mounted at one end to allow insertion into the tube in which the pieces are to be welded, said electrode arm being selectively flexible in one direction normal to its length to allow its free end to flex more easily in the one said selected direction;
   (c) feeding means for feeding a plurality of the pieces to be welded in single file along said electrode arm to the free end of said arm;
   (d) an end support mounted to and electrically connected to the free end of said electrode arm for receiving and holding the pieces to be welded in proper position for welding to the inside of the tube;
   (e) a drive cylinder mounted to said electrode arm and having a plunger, said drive cylinder being mounted to said electrode arm in position to have said plunger press against the inside surface of the tube to drive said electrode arm in its direction of selected flexibility such that pieces to be welded held by said end support are driven into firm contact with the inside surface of the tube; and (f) means for passing an electrical current through said electrode arm to the piece to be welded on said end support, and through the tube to weld said piece to the tube.

2. The apparatus of claim 1 wherein said electrode arm has a rectangular cross-section with the height thereof being substantially greater than the width thereof, the height of said arm being orientated vertically such that said arm has selectively greater flexibility in the horizontal direction than in the vertical direction.

3. The apparatus of claim 1 wherein the material of which said electrode arm is formed is selected from the group consisting of copper and alloys of copper.

4. The apparatus of claim 1 including a mounting member to which one end of said electrode arm is rigidly mounted and electrically insulated from said mounting member.

5. The apparatus of claim 1 wherein said tube holding means includes indexing means for rotationally and longitudinally indexing the tube.

* * * * *